US012275253B2

(12) United States Patent
Ohira et al.

(10) Patent No.: US 12,275,253 B2

(45) Date of Patent: Apr. 15, 2025

(54) LIQUID STORAGE CONTAINER AND LIQUID EJECTION APPARATUS

(71) Applicant: CANON KABUSHIKI KAISHA, Tokyo (JP)

(72) Inventors: Masatoshi Ohira, Kanagawa (JP); Shinichi Miyauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 18/181,457

(22) Filed: Mar. 9, 2023

(65) Prior Publication Data

US 2023/0321993 A1 Oct. 12, 2023

(30) Foreign Application Priority Data

Apr. 7, 2022 (JP) ................................ 2022-064147

(51) Int. Cl.
*B41J 2/175* (2006.01)
*B41J 29/17* (2006.01)

(52) U.S. Cl.
CPC ....... *B41J 2/17553* (2013.01); *B41J 2/17509* (2013.01); *B41J 29/17* (2013.01)

(58) Field of Classification Search
CPC .................................................... B41J 2/17553
See application file for complete search history.

(56) References Cited

U.S. PATENT DOCUMENTS 7,726,792 B2 6/2010 Fukushima et al. ..... B41J 2/175
8,240,826 B2 8/2012 Fukushima et al. ..... B41J 2/175
9,914,305 B2 * 3/2018 Orihara ................ B41J 2/17503
10,093,105 B2 10/2018 Shimamura et al. .... B41J 2/175
10,112,403 B2 10/2018 Ikebe et al. .............. B41J 29/13
10,399,346 B2 9/2019 Arai et al. ............... B41J 2/175
10,399,347 B2 9/2019 Miyashita et al. ....... B41J 2/175
10,427,412 B2 10/2019 Okude et al. ............ B41J 2/175
10,538,092 B2 1/2020 Miyashita et al. ....... B41J 2/175
10,611,162 B2 4/2020 Ikebe et al. .............. B41J 2/175
10,618,300 B2 4/2020 Shimamura et al. .... B41J 2/175
10,843,474 B2 11/2020 Arai et al. ............... B41J 2/175
11,192,383 B2 12/2021 Shimamura et al. .... B41J 2/175
11,623,453 B2 4/2023 Shimamura et al. .... B41J 2/175
2012/0013687 A1 1/2012 Ishizawa et al. ............... 347/85
2022/0288940 A1 9/2022 Okada et al. ............ B41J 2/175
2022/0339945 A1 10/2022 Inaba et al. .............. B41J 2/175
2022/0348020 A1 11/2022 Ogura et al. ............. B41J 2/175
2023/0286282 A1 * 9/2023 Takeda ................. B41J 2/17553

FOREIGN PATENT DOCUMENTS

JP 2012-020497 2/2012

* cited by examiner

*Primary Examiner* — Sharon Polk
(74) *Attorney, Agent, or Firm* — Venable LLP

(57) ABSTRACT

An object is to provide a liquid storage container capable of reducing the possibility of dispersion of liquid in a case where a lid member is detached. The lid member has a covering portion capable of covering the opening and a knob portion protruding from the covering portion in a direction in which the knob portion becomes more distant from the opening. The covering portion can deform into a convex shape in a case where the knob portion is pushed toward the inside from the outside of the opening in a state where the lid member is attached to the opening and can deform from the convex shape into a concave shape in a case where the knob portion is pulled up toward the outside from the inside of the opening in a state where the covering portion has deformed into the convex shape.

20 Claims, 12 Drawing Sheets

LIQUID STORAGE CONTAINER AND LIQUID EJECTION APPARATUS

FIELD OF THE INVENTION

The present invention relates to a liquid storage container and a liquid ejection apparatus.

DESCRIPTION OF THE RELATED ART

Japanese Patent Laid-Open No. 2012-20497 has disclosed a liquid storage container comprising a detachably attachable stopper member (also called "lid member") and a liquid ejection apparatus comprising the liquid storage container.

The stopper member according to Japanese Patent Laid-Open No. 2012-20497 is fit tightly to a liquid injecting port (also called "supply port") of the liquid storage container. Because of this, in a case where a user pulls out the stopper member powerfully at the time of detaching the stopper member, there is a possibility that liquid sticking to the stopper member disperses to the surroundings.

Consequently, an object of the technique according to the present invention is to provide a liquid storage container capable of reduce the possibility that liquid disperses at the time of detaching a lid member.

SUMMARY

In order to achieve the above-described object, the liquid storage container according to the present invention includes: a container main body having an opening; and a lid member capable of being detachably attached to the opening, wherein the lid member has: a covering portion capable of covering the opening; and a knob portion protruding from the covering portion in a direction in which the knob portion becomes more distant from the opening and the covering portion can deform into a convex shape in a case where the knob portion is pushed toward the inside from the outside of the opening in a state where the lid member is attached to the opening and can deform from the convex shape into a concave shape in a case where the knob portion is pulled up toward the outside from the inside of the opening in a state where the covering portion has deformed into the convex shape.

Further features of the present invention will become apparent from the following description of exemplary embodiments with reference to the attached drawings.

DESCRIPTION OF THE EMBODIMENTS

In the following, with reference to the drawings, preferred embodiments of the technique of the present invention are explained. However, the dimensions, materials, and shapes of the components and the relative arrangements thereof and the like described below are merely exemplary and should be changed appropriately in accordance with the configurations and various conditions of the apparatuses to which the present invention is applied. Consequently, it is not intended that the scope of the present invention is limited to the following descriptions. To configurations and processes that are not shown or described particularly, it is possible to apply the well-known techniques or publicly known techniques in the field of the art. Further, there is a case where duplicated explanation is omitted.

First Embodiment

In the following, with reference to the drawings, a first embodiment of the present invention is explained.

<Liquid Ejection Apparatus 200>

Figure 1:
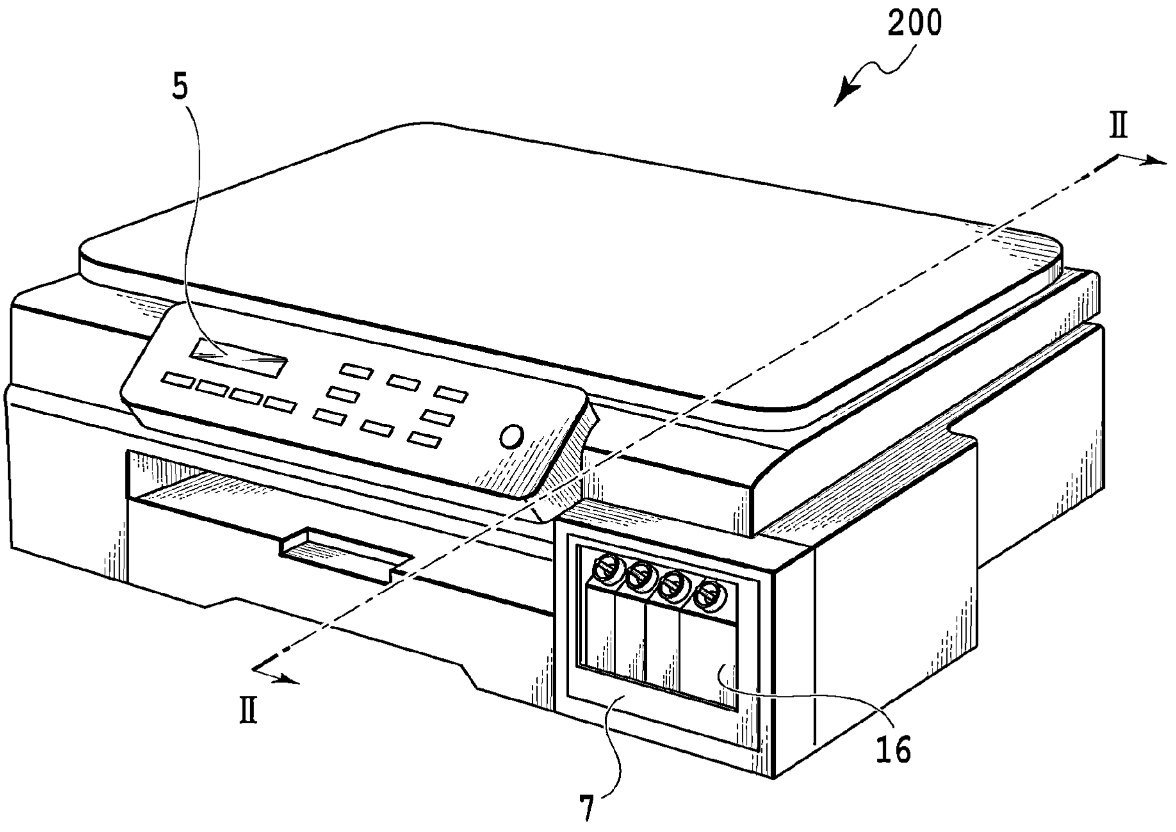
FIG. 1 is a perspective diagram showing an example of a mechanism unit of a liquid ejection apparatus.

FIG. 1 is a perspective diagram showing a mechanical unit of a liquid ejection apparatus 200 to which the present embodiment can be applied.

Figure 2:
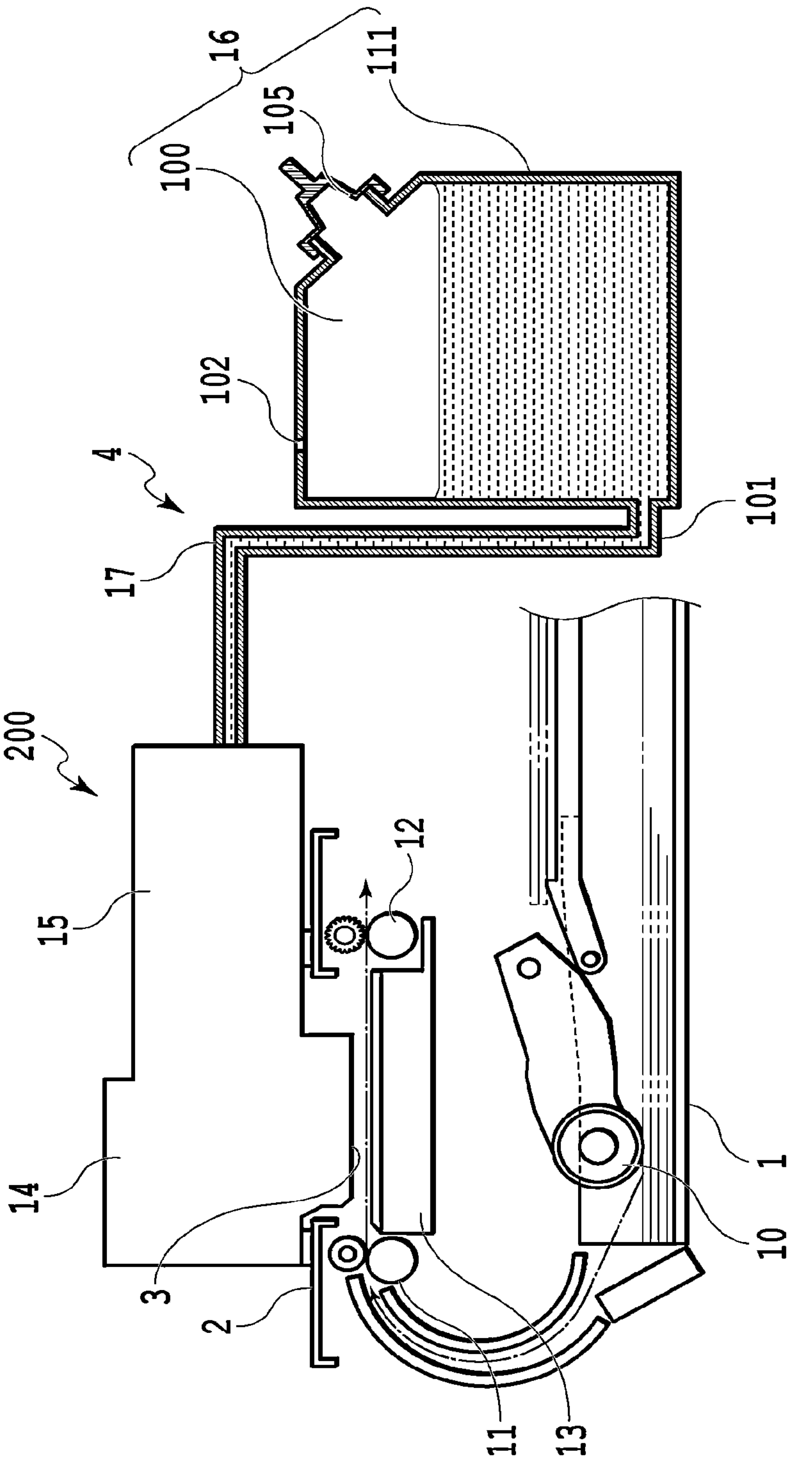
FIG. 2 is a diagram showing an example of a cross section of the liquid ejection apparatus.

FIG. 2 is a cross-sectional diagram of the liquid ejection apparatus 200 along a II-II line in FIG. 1. In FIG. 2, for convenience of explanation, the size of each member is changed or some members are omitted. The liquid ejection apparatus 200 comprises a feeding unit 1, a conveying unit 2, an ejection unit 3, a supply unit 4, a display unit 5, a liquid storage container 16, and a container cover 7 that covers a container storage unit configured to store the liquid storage container 16. The feeding unit 1 separates printing media one by one from a bundle of sheet-shaped printing media and supplies it to the conveying unit 2 by using a feeding roller 10. The conveying unit 2 is provided on the downstream side in the conveyance direction of the feeding unit 1 and comprise a platen 13 that holds a printing medium between a conveying roller unit 11 and a sheet discharge roller unit 12. The conveying unit 2 conveys the printing medium fed from the feeding roller 10 by using the conveying roller unit 11, the sheet discharge roller unit 12 and the like.

The ejection unit 3 ejects liquid to the printing medium by a liquid ejection head 15 mounted on a carriage 14. The printing medium conveyed by the conveying unit 2 is supported by the platen 13 from vertically under the printing medium. Then, an image based on image information is formed by the liquid ejection head 15 located vertically above the printing medium ejecting liquid. It is possible for the liquid storage container 16 to store liquid within the container. The supply unit 4 is configured to be capable of supplying liquid to the liquid ejection head 15 via a flow path 101 and a flexible supply tube 17 from a storage chamber 100 of a container main body 111. In the present embodiment, the liquid is ink. In detail, the four supply tubes 17 through which ink of each color (black, magenta, cyan, yellow) flows extend from the liquid storage container 16. The supply tubes 17 extending from the liquid storage container 16 are connected with the liquid storage container 16 and the liquid ejection head 15 in a state of being bundled. In a case where the liquid supplied to the liquid ejection head 15 is ejected from an ejection port of the liquid ejection head 15, the same amount of liquid as that of the ejected liquid is supplied to the liquid ejection head 15 from the liquid storage container 16. Then, in the liquid storage container 16, the same amount of air as that of the liquid supplied to the liquid ejection head 15 flows in from an air communication port 102 provided vertically above the container main body 111. The display unit 5 is used to notify a user of the state of the apparatus in operation and for the display at the time of a user selecting an operation.

<Replenishment of Liquid>

Figure 3:
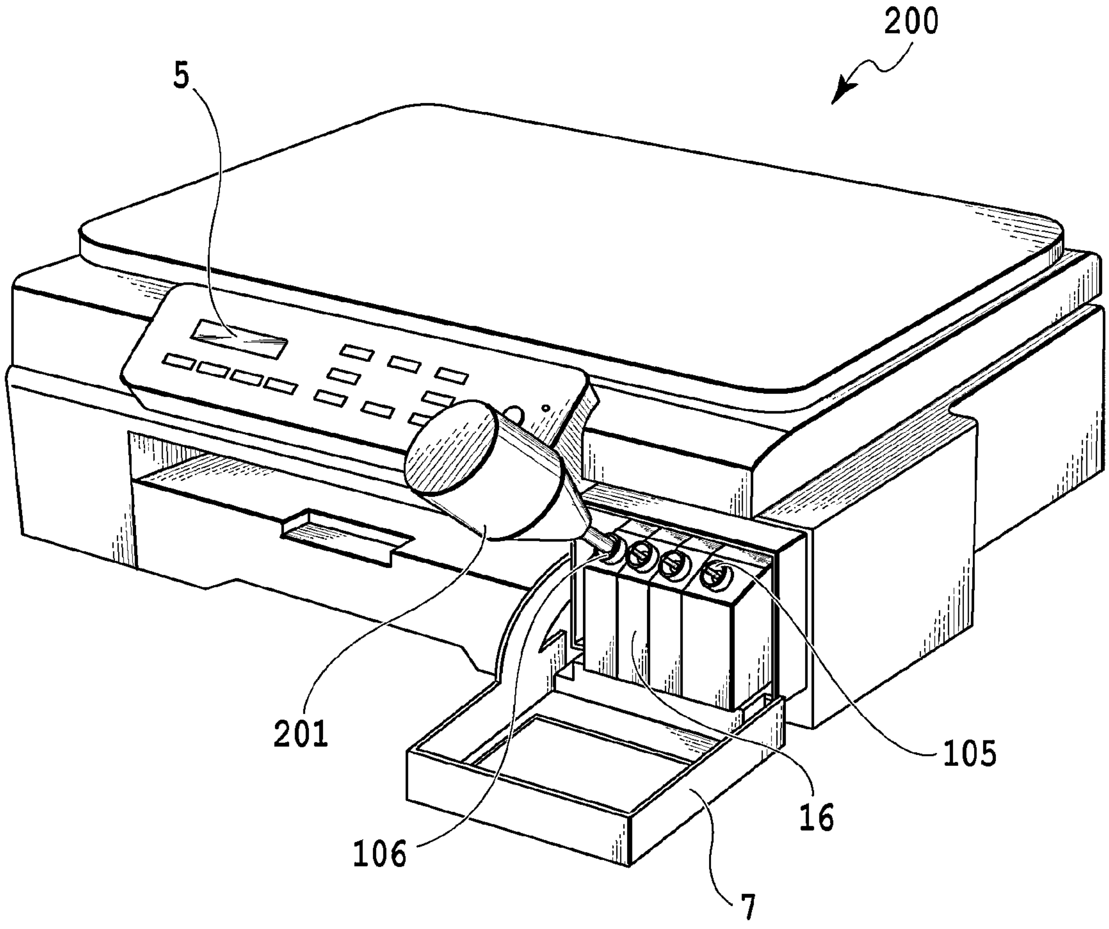
FIG. 3 is a perspective diagram showing an example of the liquid ejection apparatus that is replenished with liquid from a liquid replenishing container.

FIG. 3 is a perspective diagram showing the liquid ejection apparatus 200 that is replenished with liquid from a liquid replenishment container 201. As shown in FIG. 3, in the liquid ejection apparatus 200 of the present embodiment, in a case where liquid is supplied, a user opens the container cover 7 and supplies liquid to the inside of the storage chamber 100 from the liquid replenishment container 201 via a supply port 106 comprised by the liquid storage container 16. To the supply port 106, a lid member 105 configured to be detachably attachable to the container main body 111 and which seals the supply port 106 is attached. In a case where liquid is replenished by the liquid replenishment container 201, a user detaches the lid member 105 of the supply port 106. According to the configuration such as this, in a case where the container cover 7 is opened and the lid member 105 is detached, it is possible to supply liquid to the inside of the main body of the liquid ejection apparatus 200 in a state where the liquid storage container 16 is stored in the container storage unit provided inside the main body of the liquid ejection apparatus 200. The configuration of the liquid storage container 16 is not limited to the configuration in which the liquid storage container 16 is incorporated inside the main body of the liquid ejection apparatus 200 as in the present embodiment. As long as it is possible to supply liquid to the liquid ejection head 15 from the liquid storage container 16, a configuration may be accepted in which the liquid storage container 16 is provided outside the main body of the liquid ejection apparatus 200.

<Liquid Storage Container 16>

Figure 4:
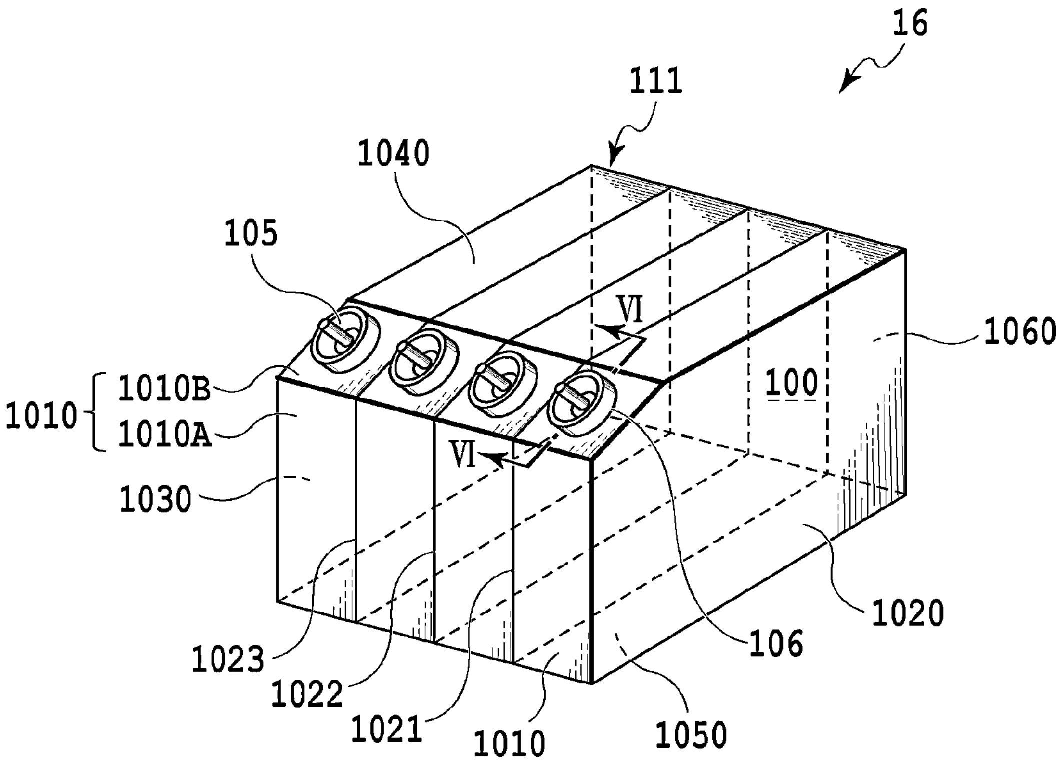
FIG. 4 is a perspective diagram showing an example of a liquid storage container of the liquid ejection apparatus.

FIG. 4 is a perspective diagram showing the liquid storage container 16 of the liquid ejection apparatus 200. The liquid storage container 16 in the present embodiment includes: the container main body 111 comprising the storage chamber 100 and the supply port 106; and the lid member 105. The container main body 111 is formed by a synthetic resin, such as polypropylene, and exhibits the outline of an approximate rectangular parallelepiped. The container main body 111 has a front wall 1010, a right wall 1020, a left wall 1030, a top wall 1040, and a bottom wall 1050. The front wall 1010 includes an erect wall 1010A extending substantially in the up-down direction from the bottom wall 1050 and an inclined wall 1010B (example of outer wall) connected to the top end of the erect wall 1010A and inclined in the up-down direction and in the forward-rearward direction. The inclined wall 1010B is inclined toward the rear face with respect to the erect wall 1010A. Further, in the inclined wall 1010B, the supply port 106 of liquid is formed.

On the other hand, the rear face of the container main body 111 is open. Then, a film 1060 is welded to the rear end portion of the right wall 1020, the left wall 1030, a first inter-color wall 1021, a second inter-color wall 1022, a third inter-color 1023, the top wall 1040, and the bottom wall 1050, the container main body 111 is sealed and a rear wall, which is the rear face, is formed. That is, by the film 1060, the rear wall of the container main body 111 is formed. With the above-described configuration, the storage chamber 100 storing liquid is formed.

<Comparative Example>

In order to make it easy to understand the lid member 105 according to the present embodiment, first, a stopper member 905 according to a comparative example is explained.

Figure 5:
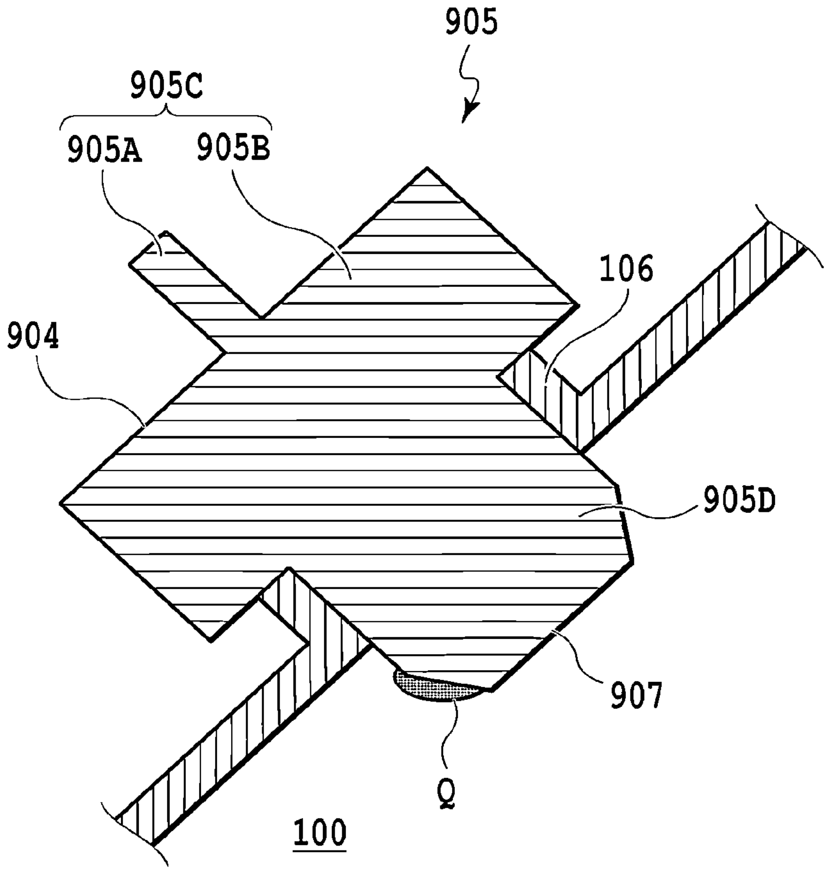
FIG. 5 is a cross-sectional diagram of a stopper member according to a comparative example.

FIG. 5 is a cross-sectional diagram of the stopper member 905 according to the comparative example. In the explanation of the stopper member 905, for the configuration the same as or corresponding to the configuration of the present embodiment, the same name or the same symbol is used. As shown in FIG. 5, the stopper member 905 comprises a main body portion 905C located outside the storage chamber 100 and the supply port 106 in the state where the stopper member 905 is attached to the supply port 106, and a stopper portion 905D that is inserted into the supply port 106 and blocks the supply port 106.

Generally, the stopper member 905 has elasticity. In a case where the stopper member 905 is attached to the supply port 106, the stopper portion 905D is inserted into the supply port 106 while being deformed elastically. Then, after the stopper portion 905D is inserted, the stopper portion 905D presses the supply port 106 from the inside toward the outside by the elastic restoring force. Due to this, the stopper member 905 enters the state where the stopper member 905 is fit tightly to the supply port 106. Further, the main body portion 905C of the stopper member 905 comprises a covering portion 905B that covers the open face of the supply port 106 and a knob portion 905A that protrudes from a top face 904 of the covering portion 905B. The knob portion 905A is also a portion that is pinched by a user at the time of detaching the stopper member 905 from the supply port 106. A user opens the supply port 106 by pulling the knob portion 905A so that the stopper member 905 is pulled out of the supply port 106. As shown in FIG. 5, the knob portion 905A is formed so as to protrude from the top face 904 of the covering portion 905B along the open face of the supply port 106 in the state where the stopper member 905 is attached to the supply port 106. In the stopper member 905 of the comparative example, a reverse face 907 is substantially horizontal with respect to the open face of the supply port 106. In this case, it may happen sometimes that a state is brought about where a sticking substance Q (for example, ink within the liquid storage container 16) sticks to the reverse face 907 of the covering portion 905B and the sticking substance Q stays due to viscosity. For example, in a case where the sticking substance Q is ink, on a condition that the ink is held on the reverse face 907 due to its viscosity, the ink becomes more likely to disperse at the time of a user pulling the stopper member 905 out of the supply port 106. Further, in a case where a user touches the reverse face 907 after detaching the stopper member 905, there is a possibility that the ink sticks to the hand of the user. The above is the explanation of the stopper member 905 according to the comparative example. In the following, the lid member 105 according to the present embodiment is explained.

<Lid Member 105>

Figure 6A:
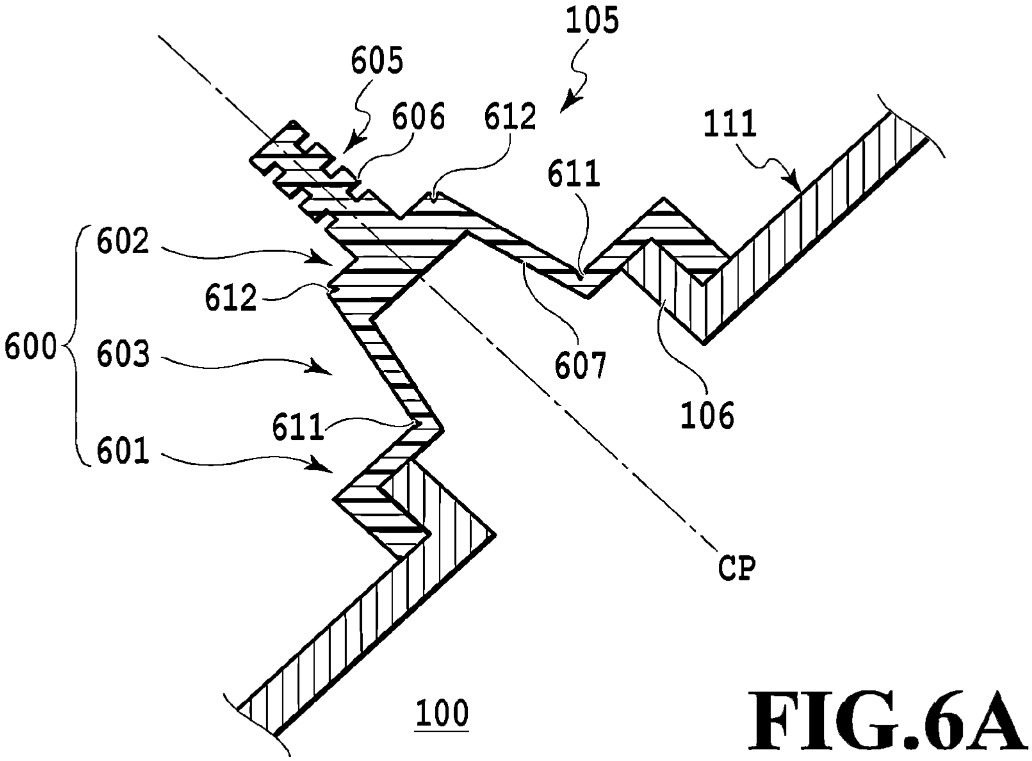
FIG. 6A and FIG. 6B are each a diagram showing an example of a cross section of a lid member.
Figure 6B:
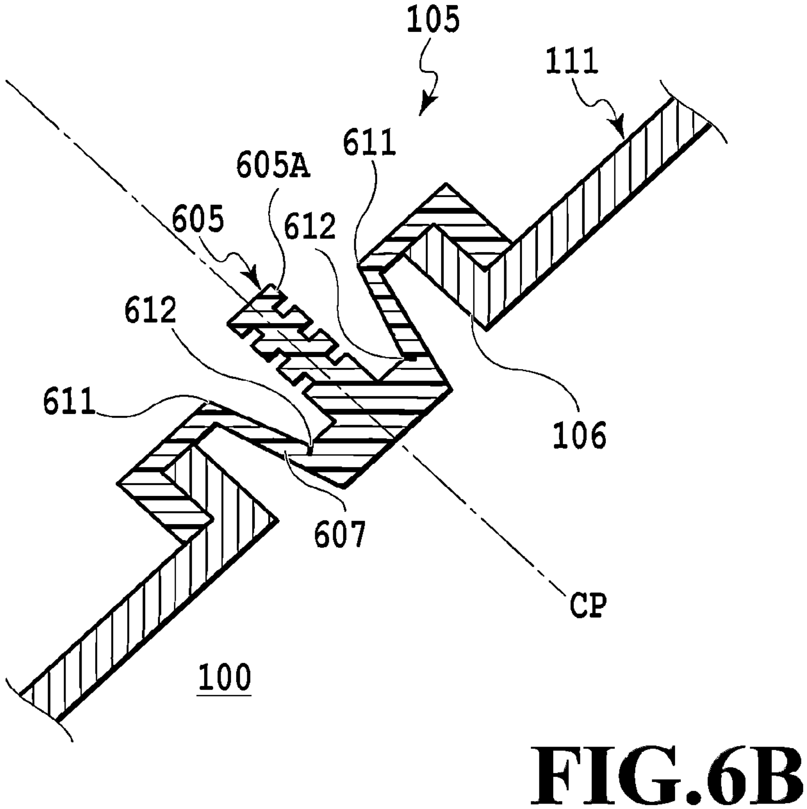

FIG. 6A and FIG. 6B are each a cross-sectional diagram of the lid member 105 according to the present embodiment. The lid member 105 is a member corresponding to the above-described stopper member 905. The cross-sectional diagram of the lid member 105 shown in FIG. 6A and FIG. 6B corresponds to the cross-sectional diagram of the stopper member 905. Further, the up-down direction in FIG. 6A and FIG. 6B matches the up-down direction in FIG. 5. FIG. 6A is the cross-sectional diagram of the lid member 105 along a VI-VI line in FIG. 4. FIG. 6B is a diagram showing a state where the lid member 105 shown in FIG. 6A has deformed. As described above, the liquid storage container 16 has the container main body 111. The container main body 111 has the supply port 106.

As shown in FIG. 6A, the liquid storage container 16 has the lid member 105 that can be attached to and detached from the supply port 106 (that is, opening). The lid member 105 has a covering portion 600 capable of covering the supply port 106. In the example shown schematically, the outer appearance of the covering portion 600 has the shape of a truncated cone. Further, the open face of the supply port 106 is provided inclined with respect to the direction of gravity. The covering portion 600 includes a first area 601, a second area 602, and a third area 603. In the state where the lid member 105 is attached to the supply port 106, the first area 601 is provided so as to be along the open face of the supply port 106 and covers part of the open face of the supply port 106. In the example shown schematically, the shape of the first area 601 a circular ring. In the state where the lid member 105 is attached to the supply port 106, the second area 602 is located in the direction in which the second area 602 becomes more distant from the supply port 106 with the position of the first area 601 being taken as a reference. In the present embodiment, the second area 602 is provided substantially horizontal with respect to the open face of the supply port 106. Further, the second area 602 is located inside the inner periphery of the first area 601. In the example shown schematically, the shape of the second area 602 is a circle.

Further, as shown schematically, the lid member 105 has a knob portion 605 protruding from the lid member 105 in the direction in which the knob portion 605 becomes more distant from the supply port 106. Specifically, in the state where the lid member 105 is attached to the supply port 106, the knob portion 605 protrudes substantially vertically from the surface of the second area 602 in the direction in which the knob portion 605 becomes more distant from the supply port 106. The state where the knob portion 605 "protrudes" is a state where the knob portion 605 protrudes sufficiently so as to enable a user to apply a force to the knob portion 605 by pinching and pulling or pushing the knob portion 605. Further, the knob portion 605 is provided at a position passed by an axial line CP passing through the center of the lid member 105 in the posture of the liquid storage container 16 at the time of detaching the lid member 105 from the supply port 106 so as to protrude from the surface of the second area 602. Preferably, the knob portion 605 has a rib portion 606. The rib portion 606 has one or a plurality of grooves in the side face of the knob portion 605. The rib portion 606 acts so as to increase the frictional force between the side face of the knob portion 605 and the finger at the time of a user hooking his/her finger(s) around the side face of the knob portion 605 in a case where the user detaches the lid member 105. The third area 603 connects the inner periphery of the first area 601 and the outer periphery of the second area 602. That is, the first area 601, the second area 602, and the third area 603 are formed continuously.

Further, a reverse face 607 of the lid member 105 is exposed toward the inside of the container main body 111 in the state where the lid member 105 is attached to the supply port 106. Then, the shape of the reverse face 607 in a case where the lid member 105 is detached from the supply port 106 is a concave formed by using the reverse face of the second area 602, the reverse face of the third area 603, and the reverse face of the first area 601. Consequently, even in a case where the sticking substance Q sticks to the reverse face 607 at the time of detaching the lid member 105 from the supply port 106, the reverse face of the third area 603 and the reverse face of the first area 601 face the inside of the lid member 105. Because of this, the sticking substance Q is suppressed from dispersing to the outside of the lid member 105 in a case where the lid member 105 is detached from the supply port 106. Consequently, according to the liquid storage container 16 of the present embodiment, it is possible to reduce the possibility of the dispersion of liquid in a case where the lid member 105 is detached. Further, it is also possible to reduce the possibility of the liquid sticking to a user after detaching the lid member 105.

However, in a case where the lid member 105 is in the state shown in FIG. 6A (in the following, appropriately referred to as "first state"), there is a possibility that the total height of the lid member 105 including the knob portion 605 becomes greater than the height of the stopper member 905 according to the comparative example. Because of this, there is a case where the knob portion 605 hits the reverse face of the container cover 7 and it is not possible to close the container cover 7. In a case where an attempt is made to maintain the clearance from the tip of the knob portion 605 up to the reverse face of the container cover 7 in order to make it possible to close the container cover 7, it may happen sometimes that there is no choice but to widen the container storage portion storing the liquid storage container 16 in the liquid ejection apparatus 200. That is, there is a possibility that the size of the liquid ejection apparatus 200 increases as a result in a case where the lid member 105 stays in the first state.

<Deformation of Lid Member 105>

Consequently, in order to make it possible to close the container cover 7, it may also be possible to design a configuration in which the lid member 105 according to the present embodiment can deform as shown in FIG. 6B. In the following, the state shown in FIG. 6B is appropriately referred to as "second state". In the configuration such as this, the covering portion 600 has a first groove 611 at the boundary between the first area 601 and the third area 603. Further, the covering portion 600 has a second groove 612 at the boundary between the second area 602 and the third area 603.

Further, the material configuring the third area 603, the first groove 611, and the second groove 612 includes a material having flexibility. The reason is that in a case where the lid member 105 is deformed from the first state into the second state, or in a case where the lid member 105 is deformed from the second state into the first state, it is necessary to bend the third area 603.

Further, the area in which the first groove 611 and the second groove 612 are formed is weak in resistance to stress compared to the area in which neither of the first groove 611 and the second groove 612 is formed. Because of this, in a case where the first groove 611 and the second groove 612 are formed in the covering portion 600, it is possible to bend the third area 603 with a force less great compared to that in a case where neither of the first groove 611 and the second groove 612 is formed. That is, in a case where the lid member 105 is deformed, it is possible to bend the third area 603 by taking the first groove 611 and the second groove 612 as a starting point. Consequently, in a case where the first groove 611 and the second groove 612 are formed in the covering portion 600, it is made easier to deform the lid member 105. Further, it is preferable for the material configuring the third area 603, the first groove 611, and the second groove 612 to include a material having plasticity. The reason is that in a case where the liquid ejection apparatus 200 is used, maintaining the second state of the lid member 105 contributes more to downsizing of the liquid ejection apparatus 200. For example, the material configuring the third area 603, the first groove 611, and the second groove 612 includes robber.

Further, the second area 602 is different from the first area 601 and the third area 603 in thickness. Specifically, the thickness of the second area 602 is greater than the thickness of the first area 601 and the third area 603. In a case where the lid member 105 is deformed by a user, the knob portion 605 protruding from the second area 602 is operated by the user. In a case where the lid member 105 is deformed from the first state into the second state by a user, the knob portion 605 is pushed toward the inside from the outside of the supply port 106. Further, in a case where the lid member 105 is deformed from the second state into the first state by a user, the knob portion 605 is pulled up toward the outside from the inside of the supply port 106. As described above, in the present embodiment, a user operates the knob portion 605, and therefore, a load is imposed on the second area 602. In order to cause the second area 602 to have durability against the load that is imposed in a case where a user operates the knob portion 605, the second area 602 is configured thick compared to the first area 601 and the third area 603. Further, because the second area 602 is thick, it is made easier to operate the knob portion 605.

Further, in a case where the lid member 105 is deformed from the first state into the second state, the knob portion 605, the second area 602, and the third area 603 move into the inside from the outside of the supply port 106. Due to this, in the second state, the second area 602 is located inside the supply port 106. Consequently, it is made possible to reduce the length by which the knob portion 605 provided in the second area 602 protrudes from the supply port 106. That is, in the second state, the height of the lid member 105 is less compared to that in the first state, and therefore, it is possible to downsize the liquid storage container 16 as a whole. Because of this, it is possible to store the liquid storage container 16 inside the liquid ejection apparatus 200 without the need to increase the size of the liquid ejection apparatus 200. Further, in a case where a user replenishes the liquid storage container 16 with liquid, the lid member 105 is detached from the supply port 106. The knob portion 605 has a length with which it is possible for the knob portion 605 to bulge out from the supply port 106 in a case where the covering portion 600 deforms into the shape of a convex (that is, in a case where the covering portion 600 deforms into the second state). Due to this, it is possible for a user to deform the lid member 105 from the second state into the first state by pinching and pulling up part of the knob portion 605 bulging out from the supply port 106.

<Detachment of Lid Member 105>

Figure 7A:
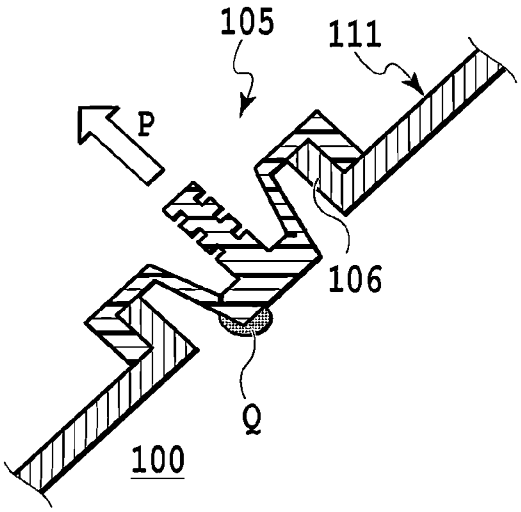
FIG. 7A to FIG. 7C are each a diagram showing an example of a process of detaching the lid member.
Figure 7B:
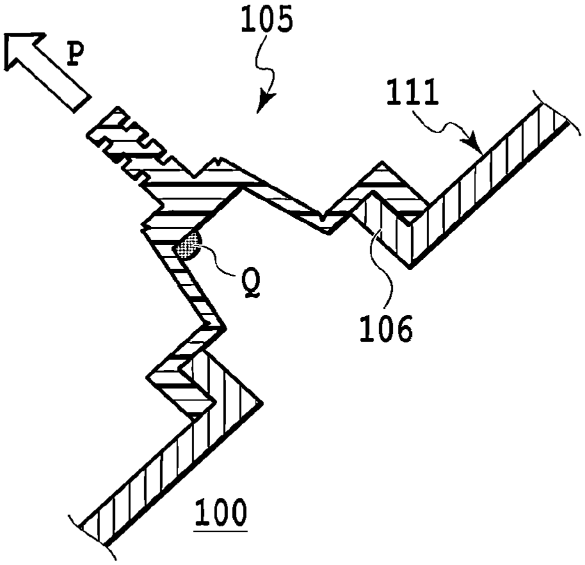
Figure 7C:
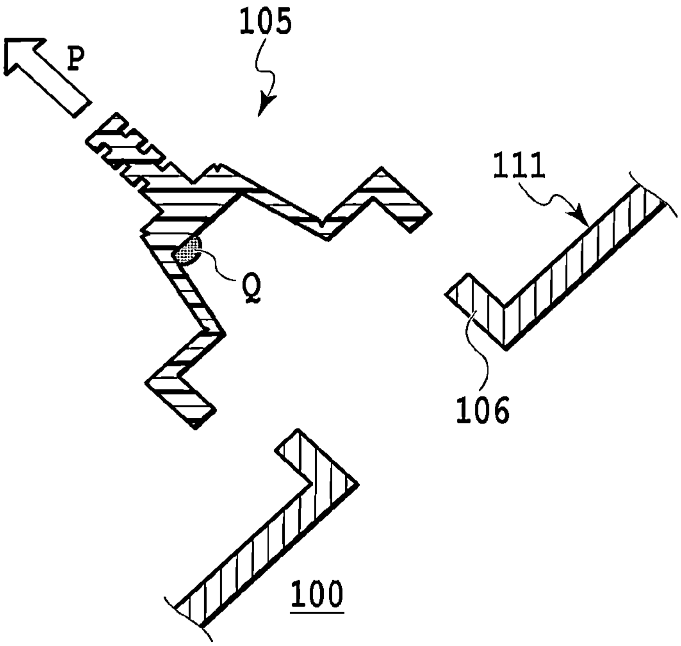

FIG. 7A to FIG. 7C are each a cross-sectional diagram showing the process of detaching the lid member 105 of the present embodiment. FIG. 7A to FIG. 7C are each a cross-sectional diagram showing the process of detaching the lid member 105 from the supply port 106 of the container main body 111 in order. In the following, the process of detaching the lid member 105 is explained in order. An arrow P in FIG. 7A to FIG. 7C indicates the direction in which the lid member 105 is detached from the supply port 106.

FIG. 7A shows the second state of the lid member 105. As shown in FIG. 7A, in the second state, the third area 603 and the second area 602 form a convex portion extending toward the inside from the outside of the supply port 106. Further, for some reason, there is a case where the sticking substance Q sticks to the reverse face 607 (see FIG. 6A and FIG. 6B) of the covering portion 600.

FIG. 7B shows the state where the lid member 105 shown in FIG. 7A has deformed from the second state into the first state. As shown in FIG. 7B, in a case where the lid member 105 is in the second state, on a condition that the knob portion 605 pulled up by a user toward the outside from the inside of the supply port 106, the lid member 105 is deformed from the second state into the first state. At this time, by the lid member 105 deforming from the second state into the first state, the third area 603 and the second area 602 having formed the convex portion in the first state form a concave portion that is concave toward the outside from the inside of the supply port 106. Then, in this state, the reverse face 607 enters the state of covering the sticking substance Q from the outside. In the example shown schematically, by the lid member 105 deforming from the second state into the first state, the sticking substance Q enters the state of being pulled into the concave portion formed by the third area 603 and the second area 602. Then, the sticking substance Q is held in the concave portion by its viscosity.

FIG. 7C shows the state where the lid member 105 is moved from the position shown in FIG. 7B up to the position shown in FIG. 7C. By further pulling up the knob portion 605 from the position shown in FIG. 7B in the direction of the arrow P, the lid member 105 is detached from the supply port 106.

<Conclusion>

In the state where the lid member 105 is attached to the opening, it is possible for the covering portion 600 to deform into the convex shape at the time of the knob portion 605 being pushed toward the inside from the outside of the opening. Further, in the state where the covering portion 600 has deformed into the convex shape, it is possible for the covering portion 600 to deform from the convex shape into the concave shape at the time of the knob portion 605 being pulled up toward the outside from the inside of the opening. Because of this, even in a case where the sticking substance Q sticks to the reverse face 607, the sticking substance Q is held at the reverse face 607 having deformed into the concave shape. Consequently, according to the liquid storage container 16 of the present embodiment, it is possible to reduce the possibility of the dispersion of liquid in a case where the lid member 105 is detached.

Further, in a case where the knob portion 605 hits the container cover 7 at the time of closing the container cover 7, it is sufficient to deform the lid member 105 from the first state into the second state. Due to this, it is possible both to suppress the dispersion of liquid at the time of detaching the lid member 105 and to downsize the liquid storage container 16. That is, according to the liquid storage container 16 of the present embodiment, it is also possible to suppress the liquid ejection apparatus 200 from becoming large while suppressing the dispersion of liquid.

Second Embodiment

In the following, with reference to the drawing, the present embodiment is explained. The basic configuration of the present embodiment is the same as that of the first embodiment, and therefore, in the following, characteristic configurations are explained. Further, the direction in the drawings showing the lid member 105 of embodiments to be described later is made the same as that in the first embodiment. An object of the present embodiment is to provide a liquid storage container capable of improving the operability in a case where the lid member 105 is formed.

Figure 8:
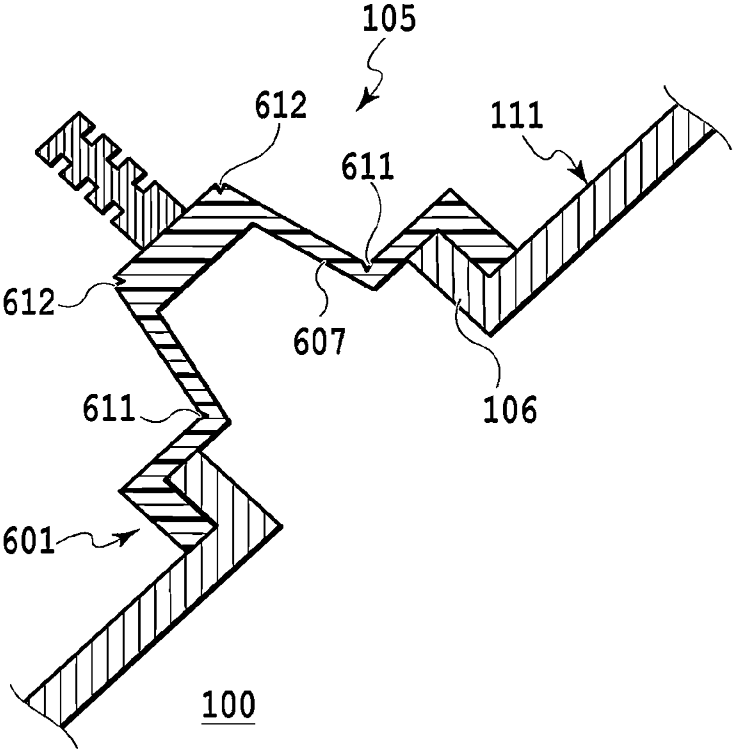
FIG. 8 is a diagram showing an example of a cross section of a lid member.

FIG. 8 is a cross-sectional diagram of the lid member 105 according to the present embodiment. As shown in FIG. 8, in the present embodiment, the material configuring the knob portion 605 and the material configuring the covering portion 600 are different. Specifically, the knob portion 605 according to the present embodiment is configured by using a material whose rigidity is higher than that of the covering portion 600 according to the present embodiment.

In a case where the knob portion 605 has rigidity, it is made easier for a user to operate the knob portion 605 at the time of pushing or pulling the knob portion 605. That is, according to the liquid storage container having the knob portion 605 according to the present embodiment, it is possible to improve the operability at the time of deforming the lid member 105

Third Embodiment

In the following, with reference to the drawing, a third embodiment of the present invention is explained. The basic configuration of the present embodiment is the same as that of the first embodiment, and therefore, in the following, characteristic configurations are explained. An object of the present embodiment is to provide a liquid storage container capable of further improving the operability at the time of deforming the lid member 105.

Figure 9:
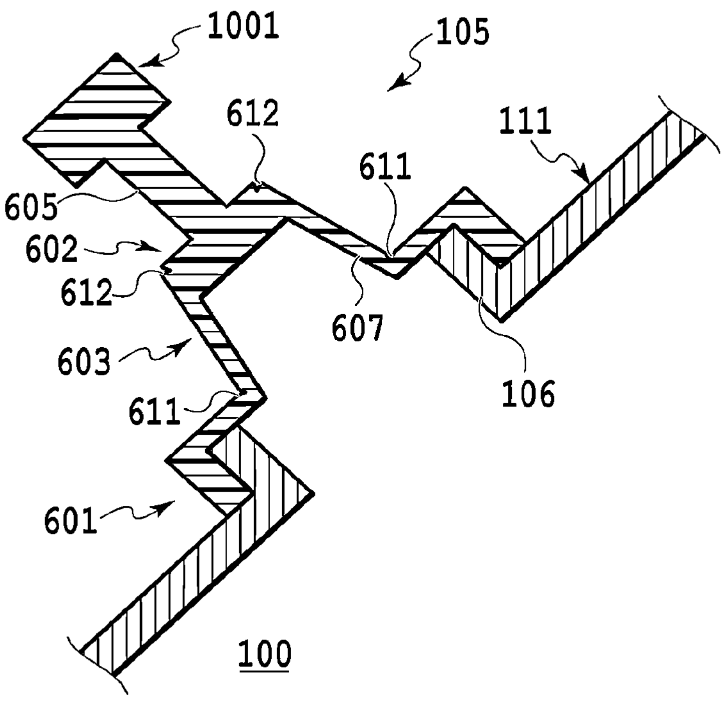
FIG. 9 is a diagram showing an example of a cross section of a lid member.

FIG. 9 is a cross-sectional diagram of the lid member 105 according to the present embodiment. As shown in FIG. 9, the lid member 105 according to the present embodiment has a first ceiling face portion 1001 whose diameter is greater than that of the knob portion 605 (in FIG. 9, the length in the left-right direction is greater). It is preferable for the material configuring the first ceiling face portion 1001 to include a material having rigidity. The reason is that in a case where the first ceiling face portion 1001 has rigidity, it is made easier for a user to pinch the first ceiling face portion 1001.

According to the configuration such as this, it is made easier for a user to hook his/her finger(s) by pinching the first ceiling face portion 1001 at the time of pulling up the knob portion 605. Further, compared to the first embodiment, in the present embodiment, it is possible to increase the area that a user touches at the time of pushing the knob portion 605. Consequently, it is made easier for a user to push the knob portion 605. Consequently, according to the liquid storage container 16 having the first ceiling face portion 1001, it is possible to further improve the operability at the time of deforming the lid member 105.

Fourth Embodiment

In the following, with reference to the drawing, the present embodiment is explained. The basic configuration of the present embodiment is the same as that of the first embodiment, and therefore, in the following, characteristic configurations are explained. An object of the present embodiment is to provide the liquid storage container 16 capable of suppressing excessive deformation of the lid member 105.

Figure 10:
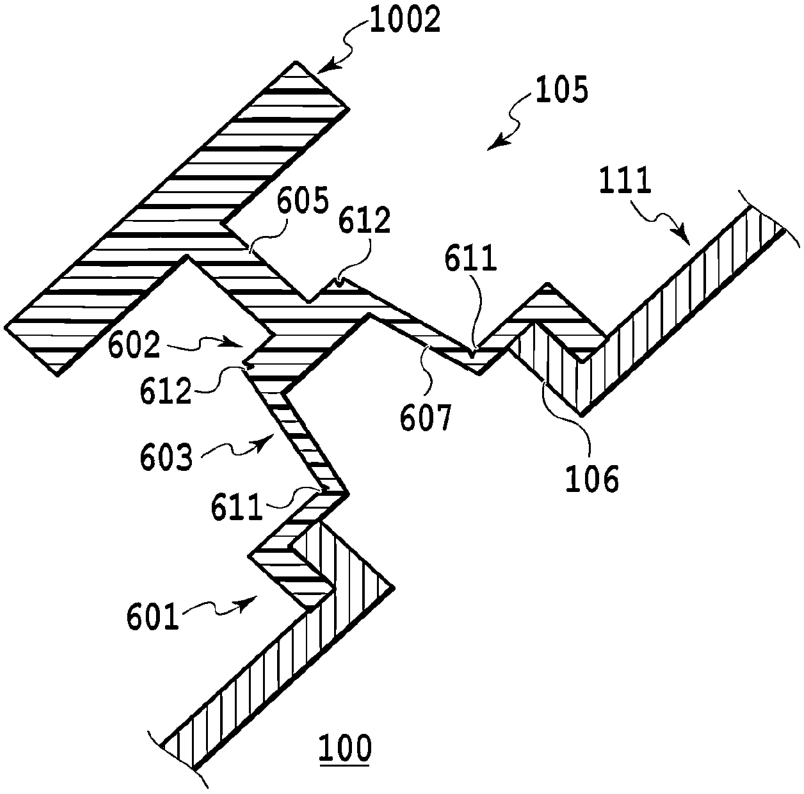
FIG. 10 is a diagram showing an example of a cross section of a lid member.

FIG. 10 is a cross-sectional diagram of the lid member 105 according to the present embodiment. As shown in FIG. 10, the lid member 105 has a second ceiling face portion 1002 whose area is wider than that of the supply port 106. It is preferable for the material configuring the second ceiling face portion 1002 to include a material having rigidity. The reason is that in a case where the second ceiling face portion 1002 has rigidity, it is made easier for a user to pinch the second ceiling face portion 1002.

According to the configuration such as this, the area of the second ceiling face portion 1002 is wider than the area of the supply port 106. Because of this, even in a case where a user pushes the knob portion 605 excessively, the movement of the knob portion 605 stops at the time of the reverse face of the second ceiling face portion 1002 hits the supply port 106 even though the knob portion 605 passes the first area 601. Consequently, according to the liquid storage container 16 of the present embodiment, in addition to the improvement of the operability described above, it is possible to suppress excessive deformation of the lid member 105 caused by pushing the knob portion 605 excessively.

Fifth Embodiment

In the following, with reference to the drawing, the present embodiment is explained. The basic configuration of the present embodiment is the same as that of the first embodiment, and therefore, in the following, characteristic configurations are explained. An object of the present embodiment is to provide the liquid storage container 16 capable of deforming the lid member 105 even in a case where a user forgets to deform the lid member 105 from the first state into the second state.

Figure 11:
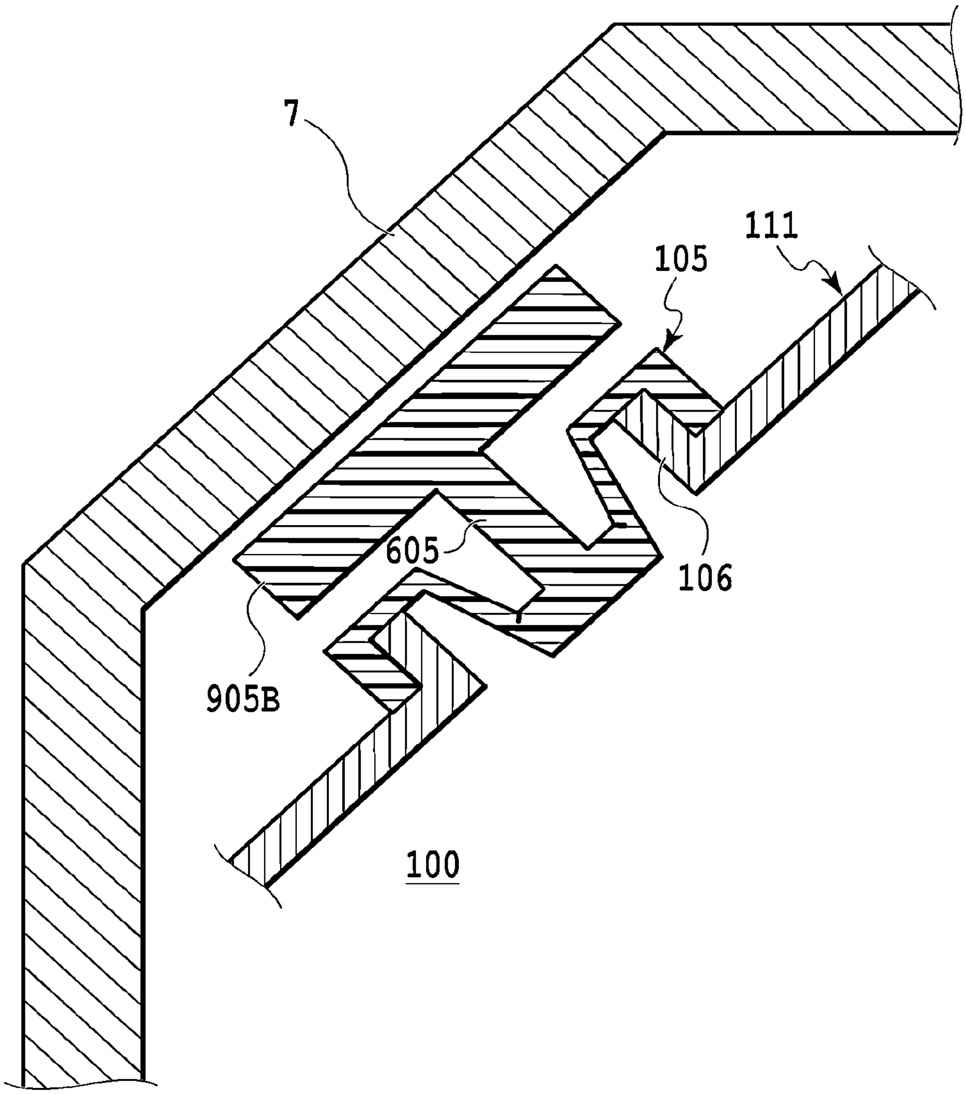
FIG. 11 is a diagram showing an example of a cross section of the lid member and a container cover.

FIG. 11 is a cross-sectional diagram showing the way the lid member 105 is deformed from the first state into the second state by the container cover 7. As shown in FIG. 11, the container cover 7 has a configuration in which it is possible to push the knob portion 605 at the time of the container cover 7 being moved in the direction in which the container cover 7 is closed by a user. Further, the knob portion 605 of the lid member 105 has a length by which it is possible for the knob portion 605 to hit the reverse face of the container cover 7 at the time of the container cover 7 being closed in the first state. It is preferable for the area that is pushed by the container cover 7 that is closed to be increased by using the second ceiling face portion 1002.

According to the configuration such as this, it is possible for a user to deform the lid member 105 from the first state into the second state by hitting the reverse face of the container cover 7 to the second ceiling face portion 1002 at the time of closing the container cover 7. Due to this, even in a case where a user forgets to deform the lid member 105 from the first state into the second state, it is possible to deform the lid member 105. Even in a case where the first ceiling face portion 1001 or the second ceiling face portion 1002 is not used, it is possible to push the knob portion 605 by using the container cover 7.

Sixth Embodiment

In the following, with reference to the drawing, the present embodiment is explained. The basic configuration of the present embodiment is the same as that of the first embodiment, and therefore, in the following, characteristic configurations are explained. An object of the present embodiment is to provide the liquid ejection apparatus 200 capable of further suppressing the dispersion of liquid.

Figure 12:
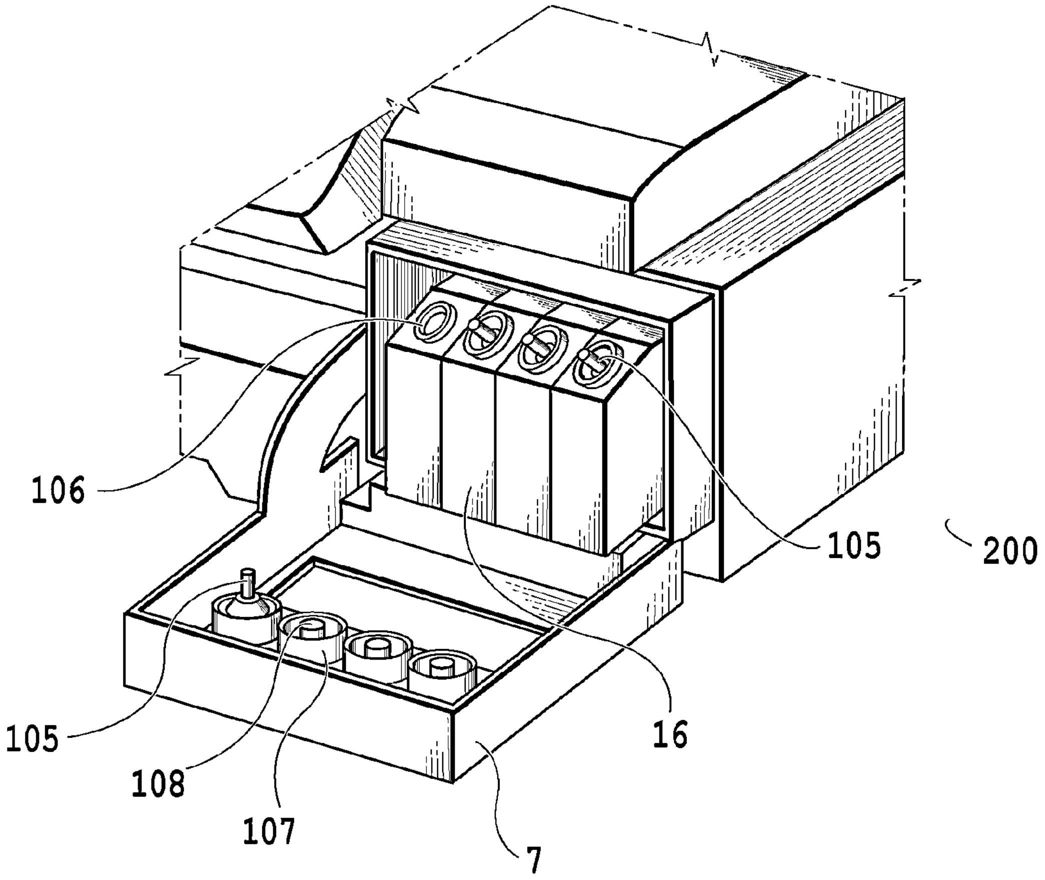
FIG. 12 is a perspective diagram showing an example of the container cover.

FIG. 12 is a perspective diagram of the container cover 7 according to the present embodiment. As shown in FIG. 12, the container cover 7 of the liquid ejection apparatus 200 according to the present embodiment has a disposing unit 107 on the reverse face of the container cover 7, in which the lid member 105 detached from the supply port 106 is disposed. Further, it is preferable for the disposing unit 107 to have a liquid absorbing portion 108. As the example of the material configuring the liquid absorbing portion 108, mention is made of an aggregate of fiber, a member that liquid is likely to penetrate, or the like. Specifically, the material configuring the liquid absorbing portion 108 includes urethane. As the example of the liquid absorbing portion 108, mention is made of an urethane sponge.

Due to this, it is possible to cause the liquid absorbing portion 108 to absorb the liquid sticking to the reverse face 607 at the time of detaching the lid member 105 from the supply port 106. Consequently, in the present embodiment, it is made easier to maintain the state where the sticking substance Q does not stick to the reverse face 607 by causing the liquid absorbing portion 108 to absorb the liquid sticking to the reverse face 607 each time the lid member 105 is detached. Consequently, according to the liquid ejection apparatus 200 of the present embodiment, it is possible to further suppress the dispersion of liquid.

Other Embodiment

In the first embodiment, the example is taken in which the example of the material configuring the lid member 105 includes a material having plasticity, but the material configuring the lid member 105 may include a material having elasticity. According to the configuration such as this, it is possible to deform the lid member 105 contracted by the container cover 7 being closed from the second state into the first state using the elastic restoring force at the time of the container cover 7 being opened without the need for a user to perform the operation. Further, according to the configuration such as this, there is a case where the sticking substance Q sticking to the reverse face 607 returns to the inside of the container main body 111 due to the vibration at the time of the lid member 105 deforming from the second state into the first state. Due to this, it is possible to suppress the dispersion of liquid at the time of detaching the lid member 105 from the supply port 106.

According to the liquid storage container of the present invention, it is possible to reduce the possibility of dispersion of liquid at the time of detaching a lid member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-064147, filed Apr. 7, 2022 which is hereby incorporated by reference wherein in its entirety.

What is claimed is:

1. A liquid storage container comprising:
a container main body having an opening; and
a lid member capable of being detachably attached to the opening, wherein
the lid member has:
a covering portion capable of covering the opening; and
a knob portion protruding from the covering portion in a direction in which the knob portion becomes more distant from the opening and
the covering portion can deform into a convex shape in a case where the knob portion is pushed toward the inside from the outside of the opening in a state where the lid member is attached to the opening and can deform from the convex shape into a concave shape in a case where the knob portion is pulled up toward the outside from the inside of the opening in a state where the covering portion has deformed into the convex shape.

2. The liquid storage container according to claim 1, wherein
a material configuring the covering portion includes a material having flexibility.

3. The liquid storage container according to claim 2, wherein
a material configuring the covering portion includes a material having elasticity.

4. The liquid storage container according to claim 2, wherein
a material configuring the covering portion includes a material having plasticity.

5. The liquid storage container according to claim 2, wherein
a material configuring the covering portion includes rubber.

6. The liquid storage container according to claim 2, wherein
the covering portion:
includes a first area covering part of the opening, a second area located in a direction in which the second area becomes more distant from the first area or the opening and provided with the knob portion, and a third area connecting the first area and the second area;
has a first groove formed at a boundary between the first area and the third area; and
has a second groove formed at a boundary between the second area and the third area.

7. The liquid storage container according to claim 1, wherein
a material configuring the knob portion includes a material different from a material configuring the covering portion.

8. The liquid storage container according to claim 1, wherein
a material configuring the knob portion includes a material having rigidity.

9. The liquid storage container according to claim 1, wherein
the knob portion has a length by which the knob portion can bulge out from the opening in a case where the covering portion deforms into the convex shape.

10. The liquid storage container according to claim 1, wherein
the knob portion has a rib portion on a side face.

11. The liquid storage container according to claim 1, wherein
the knob portion has a ceiling face portion whose diameter is greater than that of the knob portion.

12. The liquid storage container according to claim 11, wherein
a material configuring the ceiling face portion includes a material having rigidity.

13. The liquid storage container according to claim 1, wherein
the knob portion has a ceiling face portion whose area is wider than that of the opening.

14. A liquid ejection apparatus comprising:
the liquid storage container according to claim 1; and
a liquid ejection head ejecting liquid stored in the liquid storage container.

15. The liquid ejection apparatus according to claim 14, comprising:

a container storage unit configured to store the liquid storage container inside a main body of the apparatus; and a container cover covering the container storage unit, wherein the container cover can push the lid member in a case where the container cover is moved in a direction in which the container cover is closed.

16. The liquid ejection apparatus according to claim 15, wherein in a case where the container cover is opened and the lid member is detached, liquid can be supplied to the inside of the container main body while storing the liquid storage container inside a main body of the apparatus.

17. The liquid ejection apparatus according to claim 15, wherein the container cover has a disposing unit capable of disposing the lid member.

18. The liquid ejection apparatus according to claim 17, wherein the disposing unit is provided on a reverse face of the container cover.

19. The liquid ejection apparatus according to claim 18, wherein the disposing unit has a liquid absorbing portion absorbing liquid sticking to the knob portion.

20. The liquid ejection apparatus according to claim 19, wherein a material configuring the liquid absorbing portion includes urethane.

* * * * *